UNITED STATES PATENT OFFICE.

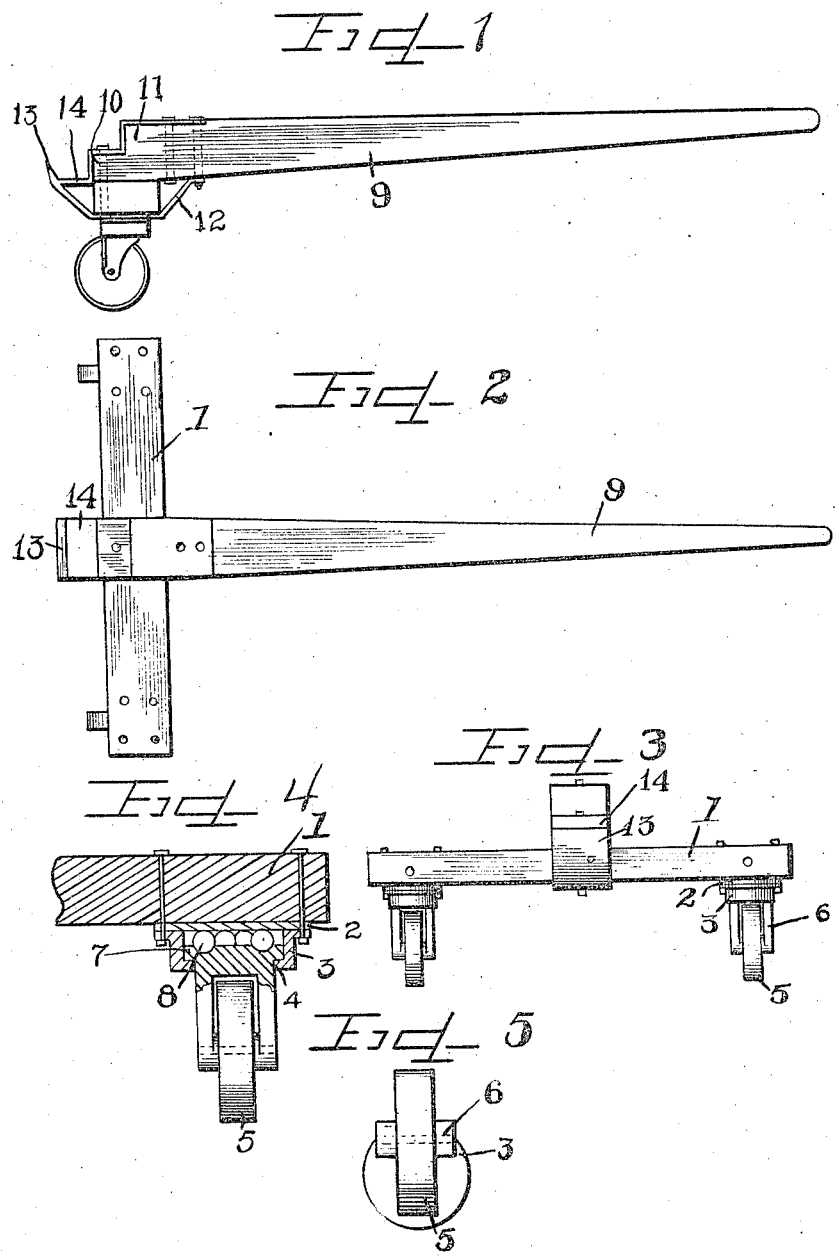

MORRILL J. TROTT, OF CHICAGO, ILLINOIS.

DOLLY.

1,043,984. Specification of Letters Patent. Patented Nov. 12, 1912.

Application filed September 16, 1911. Serial No. 649,701.

*To all whom it may concern:*

Be it known that I, MORRILL J. TROTT, a citizen of the United States, and a resident of the city of Chicago, in the county of Cook and State of Illinois, have invented certain new and useful Improvements in Dollies; and I do hereby declare that the following is a full, clear, and exact description of the same, reference being had to the accompanying drawings, and to the numbers of reference marked thereon, which form a part of this specification.

In many shops, warehouses and elsewhere, it is necessary to handle heavy weights, sometimes shifting the position but slightly and sometimes moving the same considerable distances and in some instances, as, for example, in a garage, the space in which to operate is comparatively small and in shifting or moving a car laterally, it is important that the smallest possible mechanism be used, and such as requires but small space for operation.

The object of this invention is to afford a dolly truck adapted for use in moving or shifting heavy bodies and adapted when a body is supported thereon to permit movement thereof in any direction.

It is also an object of the invention to afford a lever fulcrum upon a caster wheel or wheels and by the use of which the load may be shifted in any direction when supported on the lever.

The invention consists in the matters hereinafter described and more fully pointed out and defined in the appended claims.

In the drawings Figure 1 is a side elevation of a device embodying my invention. Fig. 2 is a top plan view thereof. Fig. 3 is a front elevation. Fig. 4 is an enlarged fragmentary section taken longitudinally of the beam and showing the housing and bearing for one of the caster wheels broken away. Fig. 5 is a bottom plan view of one of the caster wheels.

As shown in the drawings: 1 indicates a beam having rigidly secured by bolting or otherwise at each end thereof, a housing comprising a plate 2, secured on the under side of the beam and to which is rigidly secured an annular member 3, provided at its lower edge with an inwardly directed flange 4. A caster wheel 5, rotatably secured upon an offset or eccentric fork 6, is rotatably secured on said beam by means of said housing, said fork having at its upper end and integrally connected therewith, a circular plate 7, which fits in said housing and is supported on the flange 4. As shown, said plate is provided on its upper face with a groove concentric with the axis of the fork and in which are balls 8, affording an anti-friction bearing. In consequence, the point of bearing of the wheel upon the floor being eccentric with the anti-friction bearing, the beam may be pushed in any direction, the caster forks readily revolving to suitably dispose the wheels for such movement.

Rigidly bolted at one of its ends to the beam at its middle is a tapered lever 9, which may be of any desired length and which at its end above the beam, is stepped to afford shoulders 10 and 11. As shown, also, a brace bar 12, is rigidly secured on said lever at the rear side of the beam and extends beneath said beam and forwardly thereover and is shaped or formed to afford a relatively sharp upwardly and forwardly inclined step 13 to engage beneath the object to be lifted when close to the floor. Integrally united therewith is a brace bar or shoe 14, which extends rearwardly affording a lower step or shoulder and extends upwardly and over the shoulders or steps 10 and 11. The bolts, whereby the lever 9 is engaged on the beam, pass through said brace bar or bolt 14, and rigidly unite all to afford an exceedingly strong construction.

The operation is as follows: When it is desired to use the dolly the upper end of the lever may be lifted to engage the step 13, beneath the object to be lifted if very near the floor or to engage either of the shoulders 10 or 11, beneath the same. When using the lever as a lever of the second class, the weight is raised above the floor and may be shifted in any direction desired, the dolly being used by means of its lever as an ordinary truck would be or permitting lateral movement, if desired. The device may be used also as a lever by inserting the dolly beneath the load and lifting upwardly on the lever 9.

Of course, details of the construction may be varied and I do not purpose to limit the patent to be granted on this application otherwise than necessitated by the prior art.

I claim as my invention:

1. A dolly embracing a beam, a caster wheel journaled beneath each end thereof, a tapered lever secured on said beam at its middle and extending transversely of the same, one end of said lever at the beam having a section of shoulders thereon, and a shoe engaged on said end and interfitting with said shoulders.

2. A dolly embracing a beam, a rigid plate secured on each end thereof, a caster wheel rotatably secured thereon, a lever secured on said beam at its middle and extending transversely of the same, one end of said lever at the beam having shoulders thereon and the other tapering to its extremity, and a stepped shoe secured around said lever end and beam and engaging said shoulders.

3. A dolly embracing a beam, a caster journaled beneath each end of said beam, a lever secured on said beam and extending transversely of the same, one end of said lever at the beam having shoulders thereon, and a brace bar rigidly secured on said lever at the rear of said beam and extending beneath the beam and forwardly thereover and shaped to afford a relatively sharp upwardly and forwardly inclined step.

4. A dolly embracing a beam, a caster wheel journaled beneath each end thereof, a lever secured on said beam at its middle and extending transversely to the same, one end of said lever at the beam having shoulders thereon and the other tapering to its extremity, a brace bar rigidly secured on said lever at the rear side of the beam and extending beneath the beam and forwardly thereover and shaped to afford a relatively sharp upwardly and forwardly inclined step, a bar integrally connected therewith and extending rearwardly and upwardly over the shoulders said lever to afford a lower step.

In testimony whereof I have hereunto subscribed my name in the presence of two subscribing witnesses.

MORRILL J. TROTT.

Witnesses:
CHARLES W. HILLS, Jr.,
GEORGE R. MOORE.